United States Patent Office 3,846,280
Patented Nov. 5, 1974

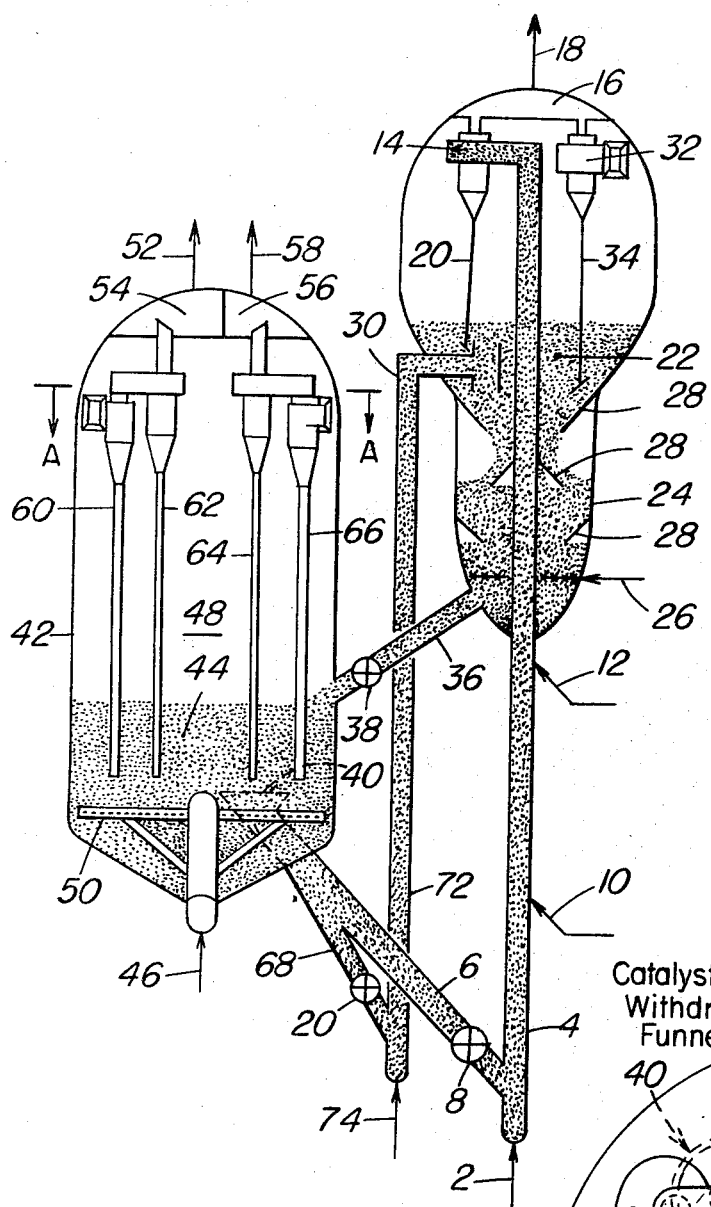
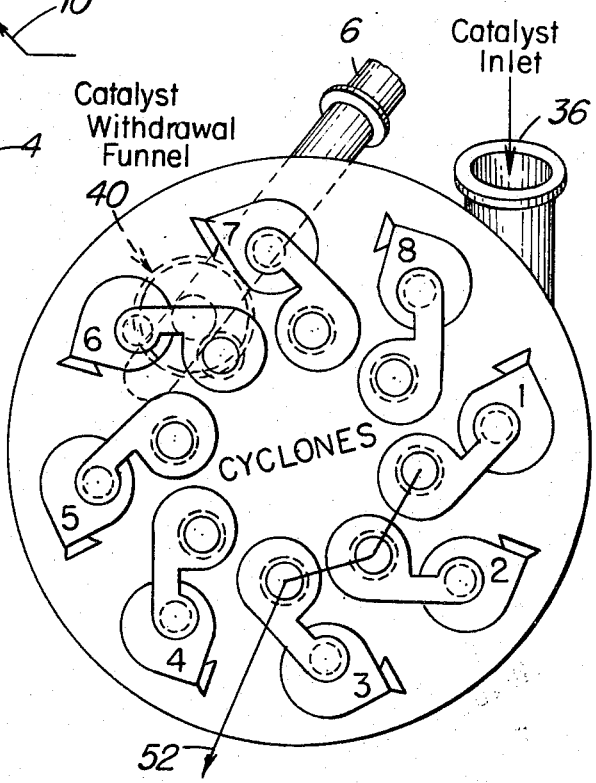
FIGURE I
FIGURE II

3,846,280
METHOD OF IMPROVING A DENSE FLUID BED CATALYST REGENERATOR USED IN CONJUNCTION WITH A RISER HYDROCARBON CONVERSION OPERATION
Hartley Owen, Belle Mead, and Edward J. Demmel, Pitman, N.J., assignors to Mobil Oil Corporation
Filed Sept. 10, 1973, Ser. No. 395,815
Int. Cl. B01j 11/68; C10g 11/18
U.S. Cl. 208—120          8 Claims

ABSTRACT OF THE DISCLOSURE

An arrangement of apparatus and method of operation is described for the fluid catalytic cracking of sulfur containing oil feeds so that sulfur compounds are retained in the hydrocarbon phase of the operation by using a hot stripper and flue gas components of regeneration comprising sulfur are segregated from flue gases essentially free of sulfur in a swirling bed catalyst regeneration operation.

BACKGROUND OF THE INVENTION

The technology of hydrocarbon conversion in the presence of finely divided catalyst particles to obtain desired products of conversion and the removal of deposited hydrocarbonaceous material from the catalyst has undergone numerous changes and improvements as the technology has been better understood and improved with time and improved conversion catalysts of the crystalline zeolite type. However, the problems of regenerating catalysts recently developed has been a source of concern since these catalysts are generally much more selective in their cracking and conversion function particularly when employed at elevated temperatures in excess of 1000° F. That is, the new family of conversion catalysts comprising crystalline zeolite hydrocarbon conversion catalyst being generally more selective under the conditions used are also considered to be both low and high coke producing catalyst and as such demand obtaining improvements in their use and particularly catalyst regeneration techniques and the recovery of heat therefrom.

SUMMARY OF THE INVENTION

The present invention is concerned with the method and system for converting sulfur containing hydrocarbons with crystalline zeolite containing cracking catalysts and regeneration of the catalyst used therein. In one aspect, the present invention is concerned with the method of improving the recovery of sulfur compounds adsorbed on the catalyst and the operation of a swirl type of dense fluid catalyst bed regeneration system. Other objects and advantages of the improved method and system of the present invention will be more apparent from the following discussion.

The present invention is concerned with the method and system for contacting finely divided fluidizable catalyst particles comprising a crystalline zeolite with a sulfur containing gasiform hydrocarbon reactant material and with regeneration gas so that the efficiency of the operation is considerably improved. In a more particular aspect the invention is concerned with a method of improving the recovery of sulfur compounds in the hydrocarbon phase and effecting regeneration of catalyst particles in a swirl type dense fluid catalyst bed regeneration operation so that the volume of sulfur containing regeneration gas recovered and requiring treating to remove sulfur can be kept at a desired low value.

In the method and system of the present invention, a crystalline zeolite hydrocarbon conversion catalyst comprising fluidizable catalyst particles and containing deactivating carbonaceous deposits due to high temperature conversion of a sulfur containing feed are combined with hot regenerated catalyst in an amount sufficient to form a mixture of contaminated and regenerated catalyst at a temperature of at least about 1000° F. and more usually a mix temperature in the range of 1050° F. to about 1250° F. This high temperature mixture of catalyst is at least 50 degrees above the temperautre of the catalyst discharged from the hydrocarbon conversion zone and is then subjected to a stripping operation by countercurrent flow to provide upflowing stripping gas. The stripping gas and stripped products of hydrocarbon conversion are recovered from a dispersed phase of catalyst above the stripping zone by cyclonic means before being passed to the hydrocarbon product separation step downstream of the hydrocarbon conversion operation. The stripped catalyst adjusted to an elevated temperature sufficient to effect decomposition of adsorbed sulfur compounds is then discharged without cooling thereof tangentially into an adjacent catalyst regeneration zone containing a dense fluid bed of catalyst. The tangentially introduced catalyst impart a swirl or circular flow to the catalyst particles being subjected to contact with oxygen containing regeneration gas under elevated temperature catalyst regeneration conditions. More particularly the deactivated and stripped catalyst desorbed of sulfur contaminants in the high temperature stripping operation is discharged into the regeneration zone in a section or upper portion thereof adjacent a dense catalyst bed interface. Thus the stripped catalyst enters the regenerator tangentially to and intermediate a relatively dense fluid bed catalyst phase and a less dense or more dilute dispersed or suspended phase of catalyst above the dense fluid catalyst bed phase. Thus by introducing the catalyst tangentially into the regeneration zone and above the most dense phase of catalyst a circumferential contact of catalyst within the regeneration zone with regeneration gas is particularly promoted with this swirl type of catalyst regeneration system. Regeneration gas is introduced to substantially the entire bottom cross-sectional area of the swirling bed or circumferentially circulating bed of catalyst for flow upwardly therethrough and removal from an upper portion of the regeneration zone after passing through cyclonic means. The regeneration zone is provided in its upper portion with a plurality of cyclonic separation means comprising first and second sequentially connected cyclonic separator means for removing catalyst fines entrained with the flue gas.

In the above described arrangement it has been found, quite unexpectedly, that a high temperature stripping operation of at least 1050° F. will retain a much larger portion of deposited sulfur compounds in the hydrocarbon phase of the operation than accomplished heretofore. Furthermore, the higher temperature of the catalyst mixture passed to the regeneration zone from the stripping zone in combination with temperature adjusted regeneration gas will move to rapidly initiate combustion of carbonaceous deposits and thus more completely and efficiently accomplish regeneration of the catalyst particles circulating in the regeneration zone.

It has been found in the regeneration operation of this invention that in the direction of the catalyst circumferential swirl in the regenerator catalyst bed, that the cyclonic separating means substantially thereabove in any given vertical quadrant and a short distance downstream from the point of catalyst tangential introduction will contain the major portion if not all of the sulfur compounds in the flue gas removed from the catalyst by oxygen regeneration. Thus in the system of this invention the first few or even 4 cyclonic combinations of primary and secondary connected cyclone separation zones will be connected for segregated flue gas recovery of sulfur containing flue gas separately from the remaining flue gases recovered in the remaining downstream combinations of cyclonic separation means in the direction of catalyst swirl within the regeneration zone. In the arrangement of the system represented by FIG. II there are eight (8) such combinations of primary and secondary sequentially connected cyclonic separation means provided in the upper cross section of the regenerator for the recovery of regeneration gas from entrained catalyst products. Thus in the method and system of this invention, at least the first 3 cyclone combinations, as shown in FIG. II, will be connected for the segregated recovery of sulfur containing flue gases separately from that collected by the remaining combinations of cyclone separation means of substantially lower or no sulfur content. The flue gases recovered by the remaining cyclone combinations in the direction of circular catalyst flow will comprise such low sulfur levels, if any, that these flue gases will usually not need treatment for sulfur removal. The separate flue gas streams may then be blended after removal of sulfur from the high sulfur containing flue gases to provide blended flue gas containing not more than 200–300 p.p.m. of $SO_2$.

Catalyst particles traversing the swirl pattern in the dense fluid catalyst bed regenerator move to a lower portion of the catalyst bed counter-current to upflowing regeneration gas and to a withdrawal well in the lower portion of the regeneration zone adjacent the upper surface of the regeneration gas distributor grid. The regenerated catalyst in the withdrawal well at an elevated temperature is transferred by a catalyst standpipe to the lower portion of a riser hydrocarbon conversion zone. Also regenerated catalyst is passed to the catalyst stripping zone as above discussed thus completing the circulation of catalyst through the system.

It is preferred to operate the catalyst regeneration zone under conditions providing regenerated catalyst at a temperature of at least 1250° F. and preferably in the range of of 1350 to 1400° F. for recycle as herein provided. Regeneration gas velocities will usually be within the range of 0.5 to about 3 or 5 ft./second.

The combination operation above described is enhanced by providing a riser hydrocarbon conversion zone adjacent thereto, which is provided with a plurality of spaced apart feed inlet conduits along the length of the riser. In this arrangement, it is contemplated introducing a low sulfur containing feed of a hydrotreated light gas oil in an initial portion of the riser reactor and a higher sulfur containing feed to a downstream portion of the riser. Furthermore, the conversion level of the higher sulfur containing feed may be restricted as a function of its sulfur level and thus the residence time of this feed altered as desired within the riser conversion zone. It is also contemplated using as feeds to the riser conversion zone, hydrogenated cyclic oils which give up hydrogen during the conversion operation as well as hydrogenated virgin and coker stocks.

BRIEF DESCRIPTION OF THE DRAWINGS

FIG. I diagrammatically represents in elevation a side-by-side arrangement of vessels comprising a riser hydrocarbon conversion zone, a catalyst stripping zone, a dense fluid bed catalyst regeneration zone, and conduit means for passing regenerated catalyst to said hydrocarbon conversion zone and said stripping zone. The regenerator plenum means is separated to permit the separate recovery of high and low sulfur containing flue gas as herein described.

FIG. II diagrammatically represents a cross-sectional view of section A—A of FIG. I showing the circular arrangement of a plurality of connected cyclonic means as related to the means for introducing and withdrawing catalyst particles from the regenerator of FIG. I. Cyclone separators 1, 2 and 3 are connected to segregate separated sulfur containing flue gases from the remaining flue gases recovered in the process.

DISCUSSION OF SPECIFIC EMBODIMENTS

Referring now to FIG. I, a hydrocarbon feed 2 such as a gas oil boiling range material boiling from about 600° F. up to 900° F. and higher is passed to the bottom portion of riser 4 for admixture with hot regenerated catalyst introduced by standpipe 6 provided with flow control valve 8. A suspension of catalyst in hydrocarbon vapors at a temperature of at least about 950° F. but more usually at least 1000° F. is formed in the lower portion of riser 4 for flow upwardly therethrough under hydrocarbon conversion conditions. The suspension initially formed in the riser may be retained during flow through the riser for a hydrocarbon residence time in the range of 1 to 10 seconds. Additional hydrocarbon feed material usually higher boiling than the gas oil feed introduced by circuit 2 or one of a higher sulfur content is introduced to the riser 4 at one or more spaced apart down stream feed injection points 10 and 12 for a hydrocarbon conversion residence time less than that employed for converting feed introduced by conduit 2. On the other hand the gas and feed may be separated so that a low boiling portion thereof or a fraction of low aromatic index rating may be initially mixed with regenerated catalyst in the riser and a higher boiling fraction or higher aromatic index material introduced at one or more downstream feed inlet points.

The hydrocarbon vapor-catalyst suspension passed upwardly through riser 14 under cracking conversion conditions of at least 950° F. is discharged into one or more cyclonic separation zones about the riser discharge and represented by cyclone separator 14. There may be a plurality of cyclone separator combinations comprising first and second cyclonic separator means attached to the riser discharge for separating catalyst particles from hydrocarbon vapors. Separated hydrocarbon vapors are passed from separator 14 to a plenum chamber 16 for withdrawal therefrom by conduit 18. Hydrocarbon vapors and gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 maintained in a dense fluid bed condition by rising gasiform material passes downwardly through a stripping zone 24 immediately therebelow and counter-current to rising stripping gas introduced to a lower portion thereof by conduit 26. Baffles 28 are provided in the stripping zone to improve the stripping operation.

The stripping operation of the present invention is further improved by the addition of hot regenerated catalyst thereto by transfer conduit 30 in an amount so that the bed of catalyst 22 provides a catalyst mixture at a temperature of at least 1000° F. and sufficient to affect decomposition of sulfur compounds. The catalyst bed 22 heated to the above identified elevated temperature by mixing hot regenerated catalyst therewith is maintained in a combination catalyst heat soaking-stripping zone 24 for a period of time sufficient to effect a high temperature desorption of feed deposited sulfur compounds which are then carried overhead by the stripping gas. The stripping gas with desorbed hydrocarbons and sulfur compounds pass through one or more cyclonic separating means 32 wherein entrained catalyst fines are separated and returned to the catalyst bed 22 by dipleg 34. On the other hand, riser 4 may terminate with the commonly known bird cage discharge device or an open end "T" connection may be fastened thereto which is not directly connected to cyclonic separation means. The cyclonic separation means may be spaced apart from the riser discharge so that an initial catalyst separation is effected by a change in velocity and the vapors less encumbered with catalyst fines then pssing through one or more cyclonic separation means. In any of these arrangements, gasiform material comprising stripping gas and sulfur compounds is passed from the cyclonic separation means represented by separator 32 to a plenum chamber 16 for removal with hydrocarbon products of the cracking operation by conduit 18. Gasiform material comprising hydrocarbon vapors is passed by conduit 18 to a product fractionation step not shown.

Hot stripped catalyst at an elevated temperature and desorbed of contaminating sulfur compounds in at least a major proportion in the high temperature stripping step is withdrawn from a lower portion of the stripping zone by conduit 36 for transfer to a dense fluid bed of catalyst in a catalyst regeneration zone. Flow control valve 36 is provided in transfer conduit 36.

The catalyst regeneration operation of the present invention is referred to as a swirl type of catalyst regeneration due to the fact that the catalyst bed tends to rotate or circumferentially circulate about the vessels vertical axis and this motion is contributed in large part by the tangential inlet of spent catalyst to the circulating dense fluid catalyst bed. Thus the tangentially introduced catalyst at an elevated temperature is further mixed with some hot regenerated catalyst or catalyst undergoing regeneration at an elevated temperature and is caused to move in a circular or swirl pattern about the regenerators vertical axis as it also moves generally downward to a catalyst withdrawal funnel adjacent the regeneration gas distributor grid. The catalyst withdrawal funnel is positioned adjacent a vertical plane of the regenerator vessel passing through the catalyst tangential inlet so that catalyst particles introduced to the regenerator will traverse substantially the circumference of the regenerator vessel before encountering withdrawal therefrom as above described. In this catalyst regeneration environment comprising circulating catalyst it has been found that the regeneration gases comprising flue gas products of carbonaceous material combustion tend to move generally vertically upwardly through the circulating bed of catalyst to the cyclone separators positioned above the bed of catalyst in any given vertical segment. This phenomenon in cooperation with the process operating concepts of this invention permits segregating flue gas products of high and low sulfur content so that only a relatively small portion of the total flue gas stream needs to be treated for recovery of sulfur therefrom. The flue gas treated to remove, for example $SO_2$ therefrom, may then be blended with the low sulfur flue gases to provide a flue gas containing not more than 200 to 300 p.p.m. of $SO_2$ before passing to heat recovery equipment such as a CO boiler, etc. Thus, as shown by FIG. II, the catalyst tangentially introduced to the regenerator by conduit 36 causes the catalyst to circulate in a clockwise direction in this specific embodiment. As the bed of catalyst continues its circular motion some catalyst particles move from an upper portion of a mass of catalyst particles suspended in regeneration gas downwardly therethrough to a catalyst withdrawal funnel 40 in a segment of the vessel adjacent to the catalyst inlet segment. In the regeneration zone 42 housing a mass of circulating suspended catalyst particles 44 in upflowing oxygen containing regeneration gas introduced to the lower portion thereof by conduit distributor means 46, the density of the mass of suspended catalyst particles may be varied by the volume of regeneration gas used therein. Generally speaking, the circulating suspended mass of catalyst particles 44 undergoing regeneration with oxygen containing gas to remove carbonaceous deposits by burning will be retained as a fairly dense suspended mass of swirling catalyst particles in the lower portion of the vessel and a much less dense phase of suspended catalyst particles 48 will exist thereabove to an upper portion of the regeneration zone. Under relatively low regeneration gas velocity conditions, a rather distinct line of demarcation will exist between the dense fluid bed of suspended catalyst particles and the more dispersed suspended phase thereabove. However, as the regeneration gas velocity conditions are increased there is less of a demarcation line and the suspended catalyst passes through regions of catalyst particle density generally less than about 30 lbs. per cu. ft. A bed density of at least 20 lb./cu. ft. is preferred.

A segmented regeneration gas distributor grid position in the lower cross sectional area of the regeneration vessel 42 is provided and adapted to control the flow of regeneration gas passed to any one segment of the distributor grid and thus to each segment of the mass of catalyst particles thereabove. In this arrangement, it has been found that even with the circulating mass of catalyst, the flow of regeneration gas is generally vertically upwardly through the mass of catalyst particles so that regeneration gas introduced to the catalyst bed beneath cyclone combinations 1 to 3 will move generally vertically upwardly through the the catalyst and be removed by these cyclone combinations. Thus sulfur compounds initially removed by oxygen containing combustion gases upon initial contact in the regeneration zone may be substantially removed and segregated from the remaining combustion flue gases of the regeneration operation. In this arrangement, a segregated plenum chamber 54 is provided for collecting the sulfur containing flue gases from cyclones 1 to 3 as diagrammatically represented in FIG. I. Combustion flue gases of acceptable low sulfur content or no significant amounts of sulfur are removed by cyclone separator combinations 4, 5, 6, 7 and 8 which are connected for discharge into a separate plenum chamber 56 and withdrawal therefrom by conduit 58. The cyclone combinations represented in FIG. I are intended to correspond to that represented in FIG. II and accomplish the results desired as above expressed. Catalyst particles separated from the flue gases passing through the cyclones are returned to the mass of catalyst therebelow by the plurality of catalyst diplegs 60, 62, 64 and 66.

As mentioned above, regenerated catalyst withdrawn by funnel 40 is conveyed by standpipe 6 to the hydrocarbon conversion riser 4. Withdrawn regenerated catalyst is also conveyed by conduit 68 provided with flow control valve 70 to a riser transfer conduit 72 for transferring hot regenerated catalyst to the stripping step above described. Substantially any suitable gasiform material introduced by conduit 74 to the lower portion of riser 72 may be used for this purpose. In a particular application, it is contemplated using the low sulfur or sulfur free high temperature flue gases recovered from the regeneration zone after removal of oxygen therefrom for the purpose of lifting the regenerated catalyst through riser 72. On the other hand, it is contemplated positioning the regenerator sufficiently elevated so that regenerated catalyst may be passed by a sloping stand pipe to the stripping zone.

In the catalyst regeneration system of the present invention, it is contemplated employing a total catalyst recycle through the cyclone diplegs to the catalyst bed in the range of 1 to 2 volumes per volume of catalyst introduced from the stripping zone and a higher rate of catalyst circulation through one or more of the combinations of catalyst diplegs than the other diplegs. For example, a higher rate of catalyst circulation may be imposed upon the cyclone system of cyclones 1, 2 and 3 than on the remaining cyclonic systems.

Having thus generally described the improved method and system of this invention and described a specific embodiment in support thereof, it is to be understood that no undue restrictions are to be imposed by reasons thereof except as defined by the following claims.

What is claimed is:

1. In a process system for converting hydrocarbons by cracking with a fluidizable catalyst comprising crystalline zeolite material wherein the catalyst becomes deactivated with carbonaceous deposits and the catalyst is reactivated by burning of carbonaceous deposits in a regeneration zone thereby heating the catalyst to an elevated hydrocarbon conversion temperature, the method of improving the operation for converting hydrocarbon feed materials comprising sulfur which comprises,
   (a) passing a sulfur containing hydrocarbon feed with suspended freshly regenerated catalyst therein upwardly through an elongated riser conversion zone under hydrocarbon conversion conditions,
   (b) cyclonically separating hydrocarbon vapors from suspended catalyst after traversing said riser conversion zone,
   (c) combining sufficient freshly regenerated catalyst with catalyst separated from said riser conversion zone to form a mixed bed of catalyst at a temperature of at least 1050° F.,
   (d) stripping the mixed bed of hot catalyst with stripping gas at said temperature of at least 1100° F. whereby sulfur compounds are separated from the catalyst and stripped products containing sulfur and stripping gas are combined with cyclonically separated hydrocarbon vapors,
   (e) passing catalyst containing deactivating carbonaceous deposits from said stripping zone to an adjacent catalyst regeneration zone containing a dense fluid bed of swirling catalyst, said catalyst introduced to an upper portion of said bed of catalyst and tangentially thereto to influence swirl to said bed of catalyst,
   (f) passing oxygen containing regeneration gas upwardly through said bed of catalyst in said regeneration zone,
   (g) said regeneration zone provided with a plurality of separate cyclonic separation zones arranged within the upper periphery thereof with at least the first three cyclonic separation zones above said tangentially introduced catalyst and downstream therefrom in the direction of catalyst swirl being connected together for a separate recovery of regeneration flue gases from the remaining flue gas cyclonic separation and recovery zones, separately recovering flue gases as above provided,
and passing regenerated catalyst from said regeneration zone to each of said riser conversion zone and said stripping zone.

2. The process of Claim 1 wherein at least the first three cyclonic separation zones are relied upon for separating and recovering sulfur containing flue gases from said regeneration zone.

3. The process of Claim 1 wherein a low sulfur feed initially contacts freshly regenerated catalyst in said riser conversion zone and a sulfur containing hydrocarbon feed is combined with the initially formed suspension in a downstream portion of said riser conversion zone.

4. The process of Claim 1 wherein the cracking catalyst comprises a mixture of faujasite type crystalline zeolite and ZSM-5 type of crystalline material.

5. The process of Claim 1 wherein a suspension of catalyst and hydrocarbon vapors traversing said riser conversion zone is discharged directly into one or more cyclonic separation zones for separation of hydrocarbon vapors from catalyst particles.

6. The process of Claim 1 wherein the catalyst passed from said stripping zone to said regeneration zone is at a temperature of at least 1100° F.

7. The process of Claim 1 wherein flue gases freed of oxygen are relied upon for conveying regenerated catalyst to said catalyst stripping zone.

8. The process of Claim 1 wherein each of said separate cyclonic separation zones comprises a combination of first and second connected cyclonic separation zones for separating flue gases from entrained catalyst fines and said separated catalyst fines are returned to said dense fluid bed of catalyst being regenerated.

References Cited
UNITED STATES PATENTS

| | | | |
|---|---|---|---|
| 2,414,002 | 1/1947 | Thomas | 252—417 |
| 2,451,619 | 10/1948 | Hengstebeck et al. | 208—150 |
| 2,908,630 | 10/1959 | Friedman | 208—74 |
| 3,186,805 | 6/1965 | Gomory | 23—288 |
| 3,647,714 | 3/1972 | White | 252—417 |
| 3,679,576 | 7/1972 | McDonald | 208—74 |
| 3,692,667 | 9/1972 | McKinney et al. | 208—120 |

DELBERT E. GANTZ, Primary Examiner

G. E. SCHMITKONS, Assistant Examiner

U.S. Cl. X.R.

23—288 S; 408—153; 252—417